B. F. JACKSON.
GAS BURNER.
APPLICATION FILED JULY 27, 1908.
993,687.
Patented May 30, 1911.
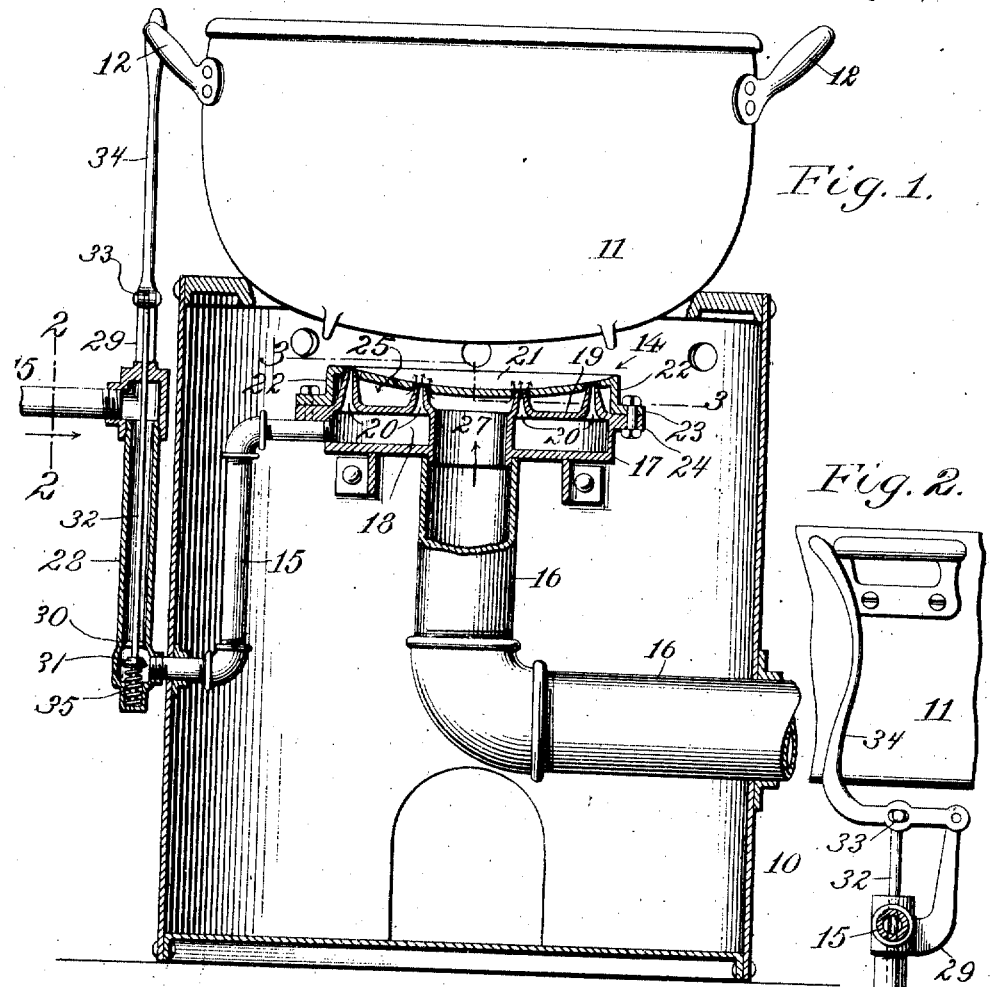
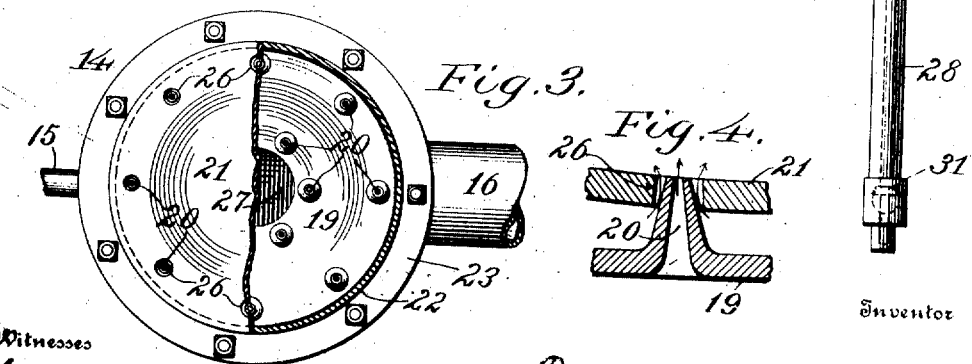

UNITED STATES PATENT OFFICE.

BENJAMIN F. JACKSON, OF JERSEY CITY, NEW JERSEY, ASSIGNOR TO JAMES HARDIE, SR., OF PITTSBURG, PENNSYLVANIA.

GAS-BURNER.

993,687.   Specification of Letters Patent.   Patented May 30, 1911.

Application filed July 27, 1908. Serial No. 445,457.

*To all whom it may concern:*

Be it known that I, BENJAMIN F. JACKSON, a citizen of the United States, and a resident of Jersey City, in the county of Hudson and State of New Jersey, have invented certain new and useful Improvements in Gas-Burners, of which the following is a specification.

The invention relates to improvements in gas-burners; and it consists in the novel features, structure and combinations of parts hereinafter described, and particularly pointed out in the claims.

I present my invention herein as embodied in a stove of the character used in factories for cooking or boiling candy, the stove proper consisting of a vertical cylindrical body having a top adapted to receive a candy kettle.

One object of my invention is to provide a highly efficient gas-burner to be located within the stove and possessing a gas-chamber and an air-chamber, the latter surrounding conical nipples from which the gas issues and said nipples being within orifices of greater diameter than themselves in the top of said air chamber, whereby air, under pressure, may be supplied to the air-chamber and issue around the nipples at the points at which ignition takes place.

A further object of the invention is to provide the gas-pipe leading to the burner with a self-closing valve and with mechanism for opening said valve, said mechanism extending above the stove in position to be engaged by the handle of the candy kettle, whereby the kettle may, when on the stove, be utilized as the means for keeping said valve in its open position. Upon the removal of the kettle from the stove the valve in the gas supply-pipe will automatically close, and thus the attendant will not have to remember to turn off the gas on removing the candy kettle, but may devote his entire attention to the kettle and its contents.

The invention will be fully understood from the detailed description hereinafter presented, reference being had to the accompanying drawings, in which:

Figure 1 is a central vertical section through a stove equipped with the burner and apparatus of my invention, the gas valve being shown as held in its open position by the kettle resting upon the stove; Fig. 2 is a detached view of the apparatus for opening the valve in the gas supply pipe, taken in the direction of the arrow of Fig. 1, and the gas supply pipe being in section on the dotted line 2—2 of Fig. 1; Fig. 3 is a detached top view, partly in section, of the gas-burner, the section being on the dotted line 3—3 of Fig. 1, and Fig. 4 is an enlarged detached sectional view showing one of the nipples of the gas-burner and a portion of the top of the air chamber containing an orifice to receive the upper end of said nipple.

In the drawings, 10 designates a customary form of stove used in candy factories, and 11 a usual form of kettle thereon, said kettle having handles 12 projecting laterally from its opposite sides.

The novel features of my invention reside in the gas-burner and its connections with which the stove is equipped. The gas burner is designated by the numeral 14, and it is supplied with gas from a supply pipe 15 and with air under pressure from an air supply pipe 16, the latter being led to the burner from any suitable blower or source of air under pressure.

The gas-burner comprises a body portion 17 within which is formed a gas-chamber 18 connected with the supply-pipe 15. The top 19 of the gas chamber 18 is formed with a series of upwardly tapering conical nipples 20 through which the gas may escape from said chamber and at the outlets from which ignition takes place. Upon the body 17 of the burner and extending entirely over the top of the same is secured a frame 21 which has a concave upper surface, a vertical encompassing flange 22 and a horizontal flange 23 extending outwardly from the lower edges of said flange 22 and seated upon an encompassing flange 24 formed integrally with the body 17 of the burner. The top frame 21 and body 17 are secured together by means of bolts passing through apertures in the flanges 23, 24; and between said top frame 21 and the top 19 of the body 17 is formed an air chamber 25, which is coextensive with the top of the body 17 and surrounds all of the nipples 20, which project upwardly through said air chamber and into orifices 26 formed in the frame 21, said orifices being of greater diameter than the nipples and permitting air to escape from around the nipples while the gas escapes through the nipples, the air and gas mixing at the points of combustion. The air chamber 25 is in communication with a tubular section 27 extending through the body portion 17 of the burner and projecting slightly below the same where it is in communication with the supply pipe 16 for air under pressure. The air chamber 25 thus receives its air from the supply pipe 16 through the tubular section 27 which opens directly into the middle of said chamber 25.

The burner is thus formed of two parts secured together and forming a gas-chamber 18 and an air chamber 25, these two chambers being independent of each other with the air chamber superposed over the gas chamber and surrounding the nipples, at the upper ends of which ignition takes place.

The gas-supply pipe 15 leads into the gas-chamber 18 and has interposed in it a vertical pipe section 28 supporting at its upper end a bracket 29 and within its lower end affording a seat 30 for a valve 31, the latter being provided for controlling the flow of gas through the pipe 15 and carried on a rod 32 which extends upwardly above the pipe section 28 and is pivotally connected, as at 33, to a lever arm 34, which is pivoted to the upper end of the bracket 29. The lever arm 34 is of angular form, as shown in Fig. 2, and when moved laterally and downwardly toward the left, looking at Fig. 2, it will depress the valve 31 from its seat and thereby open the passage for gas through the pipe 15. I provide below the valve 31 a coiled spring 35 which acts to normally hold the valve 31 closed against its seat 30. The valve 31 will thus automatically close whenever the lever arm 34 is released to permit it to close, and said valve may only be opened by pressure applied to it sufficient to overcome the force of the spring 35. The lever arm 34 extends above the stove 10 and in a position to be engaged by a handle 12 of the kettle 11, so that the kettle may be utilized as the means for holding the valve 31 in an open position; upon the removal of the kettle from the stove the valve 31 will thereby be released to automatically close. When the kettle 11 is placed on the stove it may be turned or twisted thereon to move the handle 12 against the lever arm 34 and cause said arm to turn outwardly and downwardly toward the left, looking at Fig. 2, to depress the rod 32 and open the valve 31, the weight of the kettle being sufficient to resist the force of the spring 35 tending to restore the valve and lever arm to their initial positions. When the kettle 11 is lifted from the stove 10, the lever arm 34 will thereby be released and the spring 35 will at once close the valve 31.

The burner 14 formed of the body-portion 17 and top frame or cap 21 is very advantageous in its results, in the facility with which it may be manufactured, inspected and cleaned and in its being practically indestructible. The nipples 20 are cast integrally with the body 17 and are conical or of twyer construction. The nipples 20 are in circular concentric rows, the outer row being somewhat more elevated than the inner row; and the top frame or cap 21 is in one integral casting adapted to fit down upon the body 17 with the nipples entering the orifices 26 formed therein to receive them. The frame or cap 21 presents a concave upper surface, and this feature is of importance in that it concentrates the heat below the kettle 11. The convex lower surface of the frame or cap 21 tends to an efficient distribution of the air within the air-chamber 25. The conical formation of the nipples 20 also aids in the proper distribution of the air in and its escape from the air-chamber 25, the inclined sides of said nipples preventing dead air spaces in said chamber and promoting the upward passage of the air to the outlet orifices 26.

What I claim as my invention and desire to secure by Letters Patent, is:

1. A gas burner comprising a body portion forming within it a gas-chamber, a supply pipe for gas leading into said chamber, a top-frame removably secured on said body portion and having orifices therein and forming below its top which contains said orifices and between its sides and the top of said body portion an air-chamber, means for the delivery of air to said air chamber, and a series of nipples extending upwardly from said gas-chamber through said air-chamber and into said orifices, said top frame having a concave upper surface and a convex lower surface, and said air delivery means being located to direct the air against said convex surface at its center; substantially as set forth.

2. A circular gas-burner comprising a body-portion forming within it a gas-chamber and having below its upper edge a laterally projecting flange (24), a supply pipe for gas leading into said chamber, a downwardly dished top cap having a downwardly extending flange to fit over said body portion and a laterally extending flange (23) to be removably secured to said flange on said body portion and the top of said cap having numerous orifices therein and forming below it an air-chamber, means for the delivery of air to said air-chamber, and a series of nipples extending upwardly from said gas-chamber through said air-chamber and into said orifices; substantially as set forth.

Signed at New York city, in the county of New York and State of New York, this 25th day of July A. D. 1908.

BENJAMIN F. JACKSON.

Witnesses:
 ARTHUR MARION,
 CHAS. C. GILL.